(12) United States Patent
Karasch et al.

(10) Patent No.: US 8,876,142 B1
(45) Date of Patent: Nov. 4, 2014

(54) ADAPTER WITH S-CAM

(71) Applicant: Pulliam Enterprises, Inc., Mishawaka, IN (US)

(72) Inventors: James M. Karasch, Elkart, IN (US); William A. Aske, Union, MI (US); Randall Pulliam, Mishawaka, IN (US)

(73) Assignee: Pulliam Industries, Inc., Mishawaka, IN (US)

( * ) Notice: Subject to any disclaimer, the term of this patent is extended or adjusted under 35 U.S.C. 154(b) by 0 days.

(21) Appl. No.: 13/970,126

(22) Filed: Aug. 19, 2013

Related U.S. Application Data

(60) Provisional application No. 61/684,360, filed on Aug. 17, 2012.

(51) Int. Cl.
*B60D 1/48* (2006.01)

(52) U.S. Cl.
CPC ........................................ *B60D 1/48* (2013.01)
USPC .......................... 280/495; 411/348; 403/322.2

(58) Field of Classification Search
CPC ............ B60D 1/06; B62D 53/08; B62D 1/00
USPC ............ 280/416.1, 491.5, 511, 901; 411/348; 403/322.2, 322.4; 279/2.19, 2.23
See application file for complete search history.

(56) References Cited

U.S. PATENT DOCUMENTS

| | | | |
|---|---|---|---|
| 6,065,766 | A | 5/2000 | Pulliam |
| 6,308,977 | B1 | 10/2001 | Pulliam et al. |
| 7,121,573 | B2 | 10/2006 | Lindenman et al. |
| 7,828,317 | B2 | 11/2010 | Withers et al. |
| 8,011,685 | B2 | 9/2011 | Belinky et al. |
| 2010/0109285 | A1 | 5/2010 | Stanifer et al. |

*Primary Examiner* — Joseph M Rocca
*Assistant Examiner* — Gabriela C Craciun
(74) *Attorney, Agent, or Firm* — Botkin & Hall, LLP

(57) ABSTRACT

An adapter which serves as an anchor point for coupling a trailer to a vehicle. The adapter adapted for mating in the socket of the vehicle. The adapter rotatable between a locked and an unlocked position. The adapter including a locking member which, when rotated, moves a ball partially through an aperture, partially extending into the socket thereby locking the adapter within the socket.

19 Claims, 13 Drawing Sheets

ADAPTER WITH S-CAM

CROSS-REFERENCE TO RELATED APPLICATION

This patent application claims priority from U.S. Provisional Application No. 61/684,360, filed Aug. 17, 2012, which application is hereby incorporated in its entirety by reference.

BACKGROUND OF THE INVENTION

It is common practice for vehicles to be used for towing trailers. Trailers are coupled to towing vehicles in a multitude of ways, including through the use of a socket structure positioned above the rear axle of the vehicle. Such socket structure is often formed into the bed of the vehicle. The socket structure is adapted for accepting an adapter with the adapter adapted for securing a hitch to the vehicle. In this way, the socket structure serves as an anchor point for holding a hitch to a vehicle.

The hitch is adapted for coupling to a trailer. The hitch can be one of many types known in the art, such as fifth-wheel or ball. The trailer will include a member suitable for coupling with the hitch, such as a king pin or tongue.

The hitch is either formed integrally with the adapter or is connectable to the adapter such that in either case the socket structure secures the hitch to the towing vehicle.

Previous adapters have relied on a plunger as a locking mechanism to secure the adapter in the socket structure. The present discloser describes an improved adapter. The present adapter is designed such that when a trailer is coupled to the hitch, the adapter must be locked in the socket.

SUMMARY OF THE INVENTION

This disclosure describes an adapter suitable for being locked within the socket structure of a vehicle. The socket is formed integrally with the vehicle and is adapted for supporting a trailer behind the vehicle. The adapter is formed having a collar which houses a locking mechanism. The locking mechanism is disposed within the collar. An arm extends from the collar and is in rotational contact with the locking mechanism, such that rotation of the arm moves the locking mechanism between a locked and an unlocked position. The locking mechanism is formed having a cam, preferably an S-cam, having a shaft passing through the center of the S-cam, which shaft transfers rotative motion between the arm and the S-cam. The collar includes an aperture proximate the S-cam. The S-cam includes a camming surface defined by a shallow recess and a deep recess. As the S-cam is rotated, a ball moves between the shallow recess and the deep recess. The locked position is defined by the ball forming an interference fit with the shallow recess and the aperture, with a portion of the ball extending beyond the aperture. A cavity is formed in the socket, such that when in the locked position, the ball partially extends into the cavity and prevents the adapter from being removed from the socket. The unlocked position is defined by the ball nested against the deep recess and recessed from the socket's cavity, thereby allowing the adapter to be inserted in or withdrawn from the socket.

The upper rim of the collar is castellated, such that the rim includes notches with a first notch defining a locked position and a second notch defining an unlocked position. With the arm rested in the first notch the locking mechanism is prevented from rotating. The arm may be pulled up and away from the first notch and rotated to the second notch to unlock the locking mechanism.

The arm also includes a tab which serves as a secondary locking device. The tab extends uprightly from one end of the arm, and engages a portion of the hitch assembly. The tab is configured such that the hitch assembly can only be installed when the locking mechanism is in the locked position. The tab is also configured such that with the hitch assembly installed, the locking mechanism cannot be moved to the unlocked position—the tab forms an interference fit with the hitch assembly in such a way that the arm cannot be rotated to the unlocked position with the hitch installed. In this way, the tab serves to prevent the adapter from coming free from the socket when the hitch assembly is mounted to the adapter.

BRIEF DESCRIPTION OF THE DRAWINGS

A preferred embodiment of this invention has been chosen wherein.

DESCRIPTION OF THE PREFERRED EMBODIMENT

Figure 1:
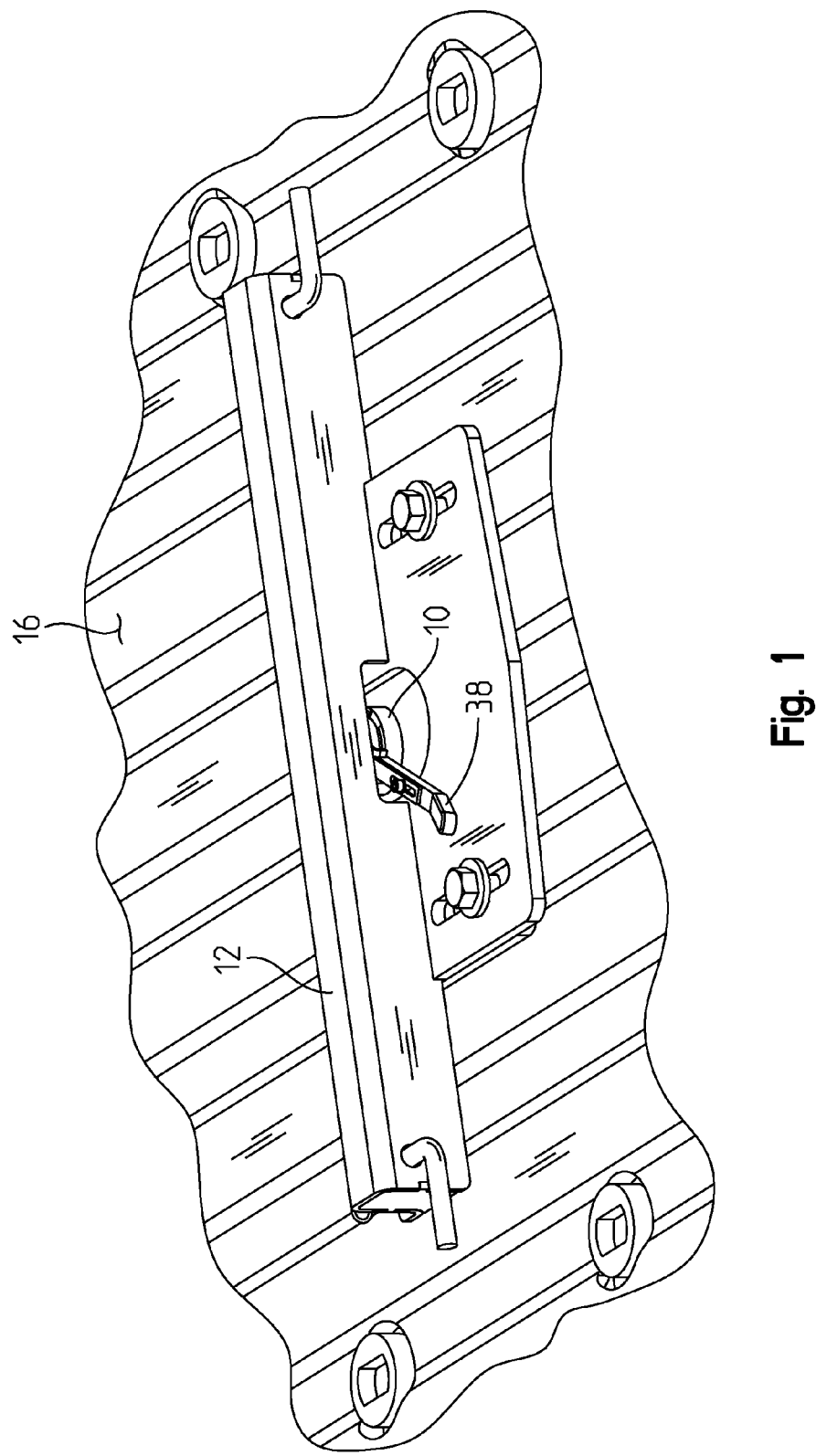
FIG. 1 is a perspective view of the adapter seated in the socket in the bed of a vehicle and having a portion of a hitch assembly mounted above the adapter.
Figure 2:
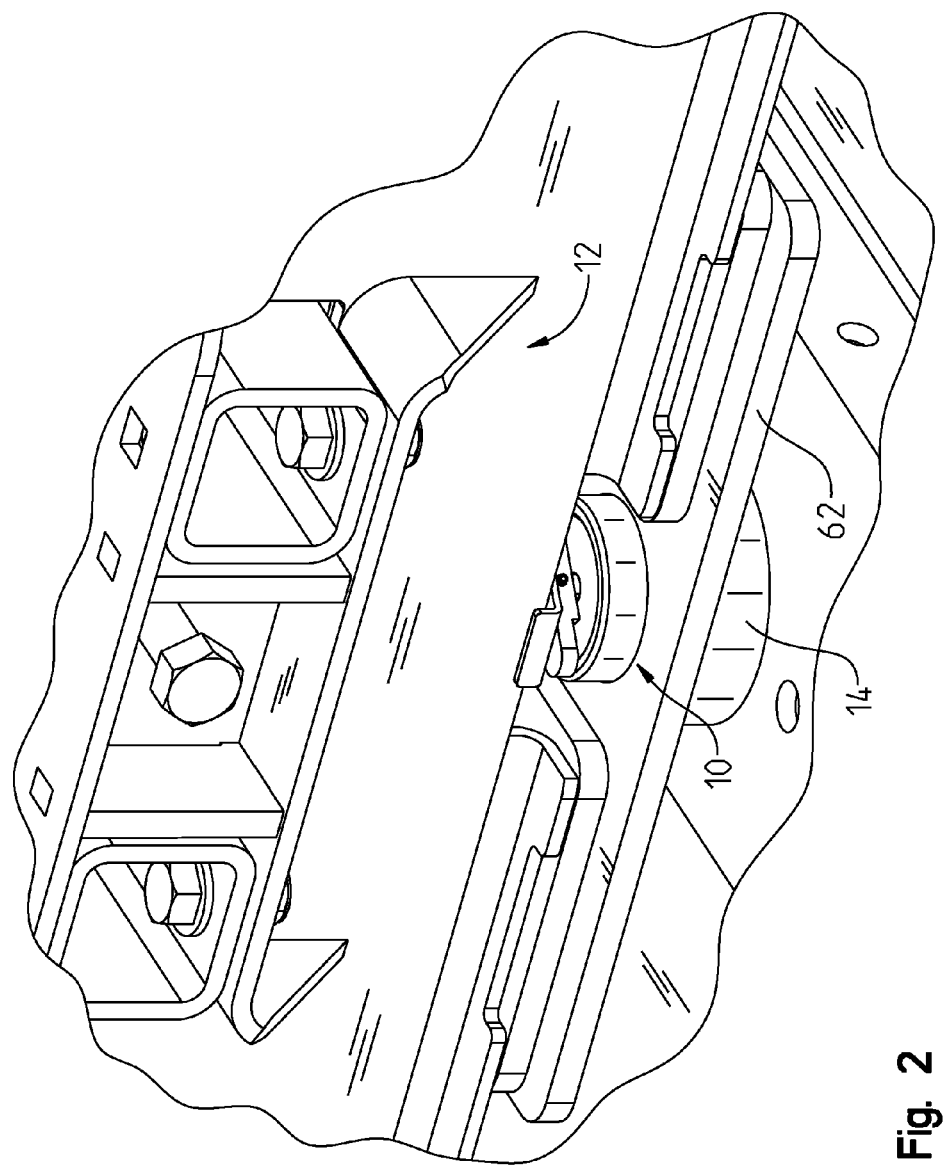
FIG. 2 is a perspective view of the adapter of FIG. 1 and showing a hitch mounted above the adapter.
Figure 3:
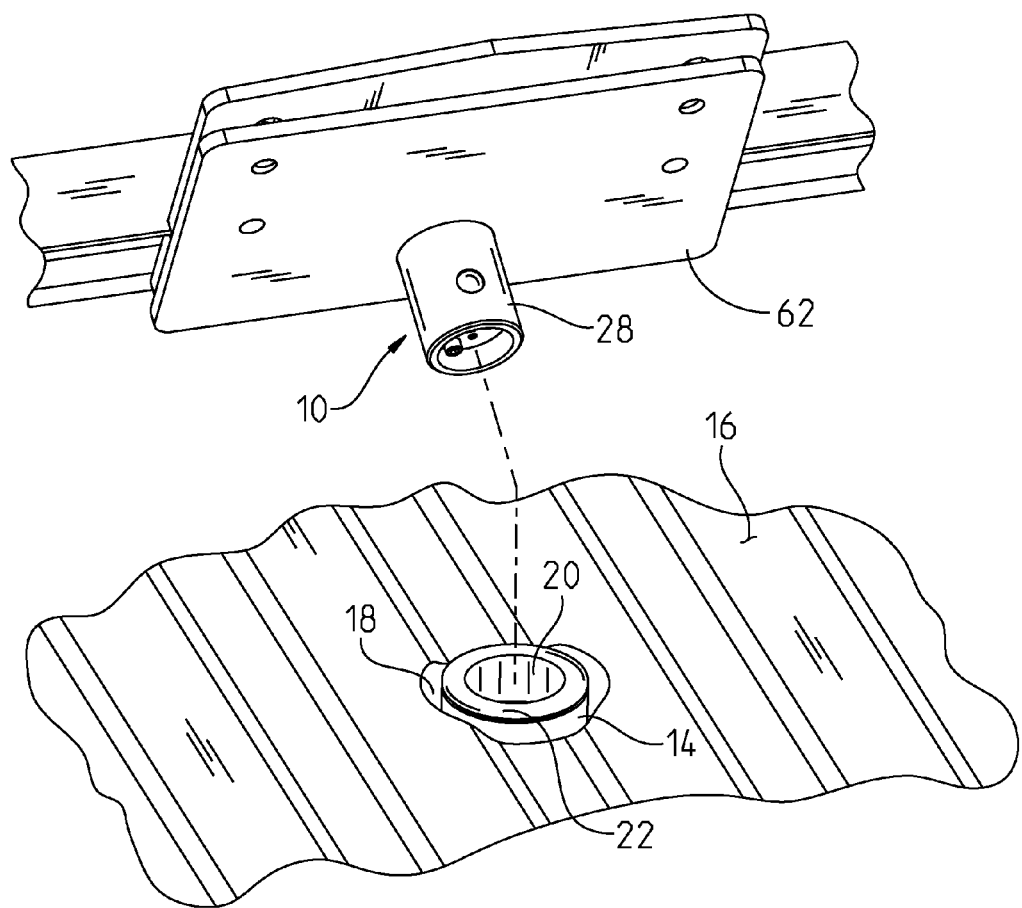
FIG. 3 is a perspective view showing the adapter and hitch assembly positioned above the socket.

The present disclosure describes an adapter 10 suitable for securing a hitch assembly 12 in a socket 14, as shown in FIGS. 1 and 2, of a towing vehicle (not shown). Hitch assembly 12 is adapted for being coupled to a trailer (not shown), such that the trailer is pulled behind the vehicle. Referring to FIG. 3, socket 14 is preferably a can-shaped socket extending below the bed 16 of a vehicle, wherein the bed includes an opening 18 below which the socket 14 is positioned. Socket 14 is essentially a hollow cylinder defined by an opening 20 and a wall 22. Socket 14 includes a cavity 26, see FIG. 5, which forms a depression in wall 22 of the socket, with cavity 26 preferably annular-shaped and spanning the diameter of the socket. Cavity 26 serves as an anchor point for restricting adapter 10 from being removed from socket 14. Thereby, adapter 10 is lockable within socket 14, whereby when adapter 10 is locked within socket 14 hitch assembly 12 is secured to vehicle.

Figure 4:
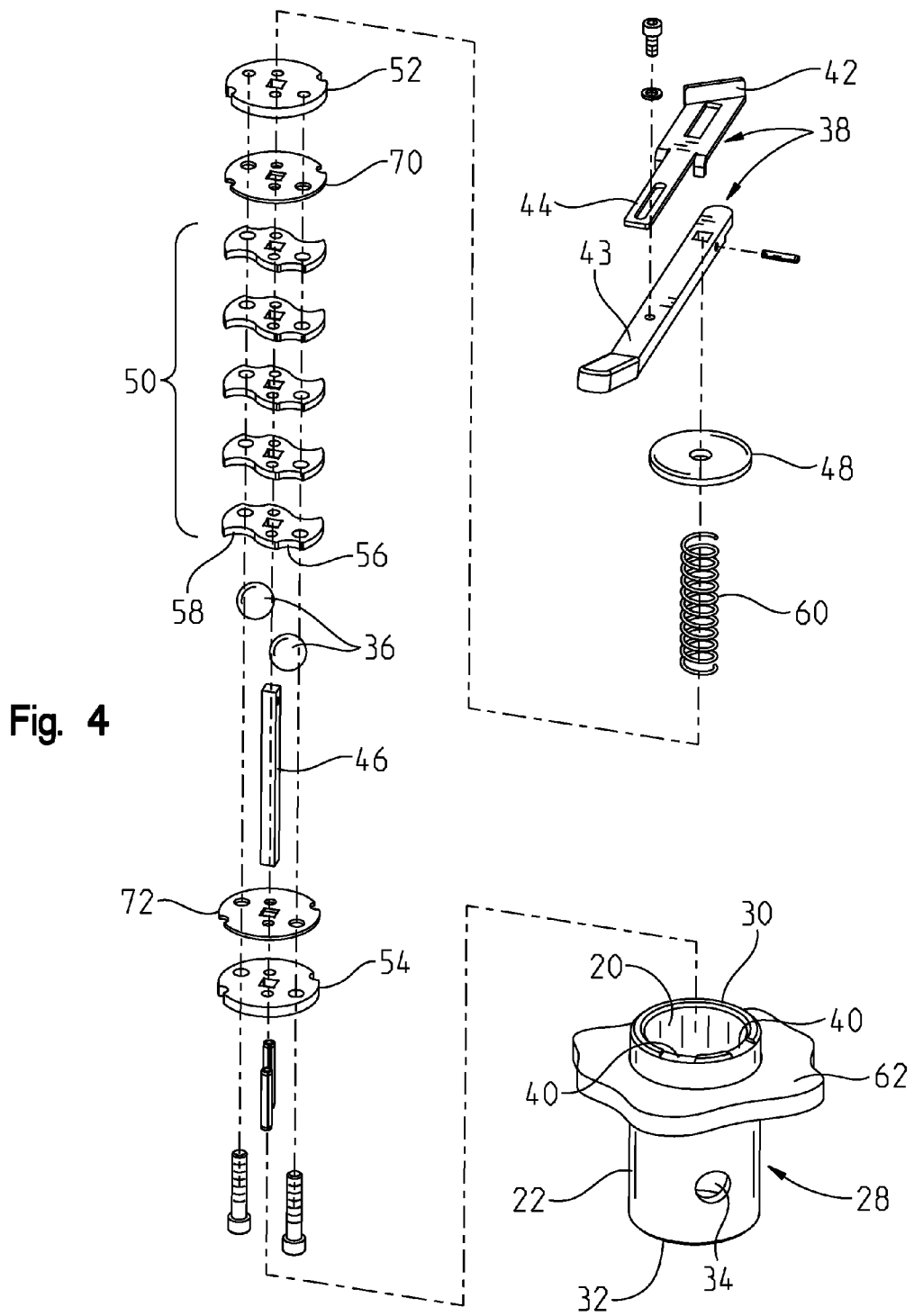
FIG. 4 is an exploded view of the adapter.
Figure 5:
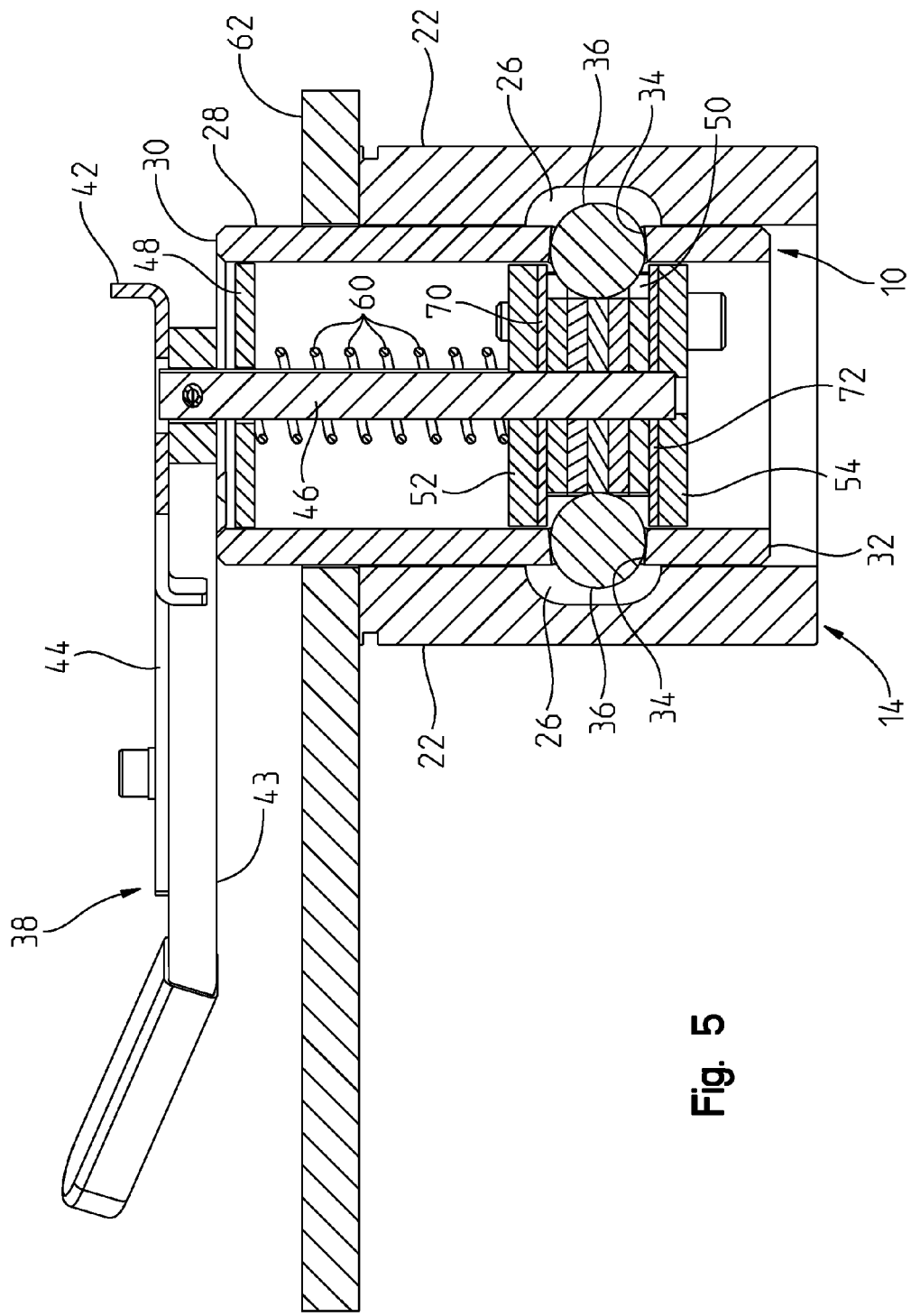
FIG. 5 is a cross-sectional side view of the adapter as seated in the socket and with the locking mechanism in the locked position.
Figure 6:
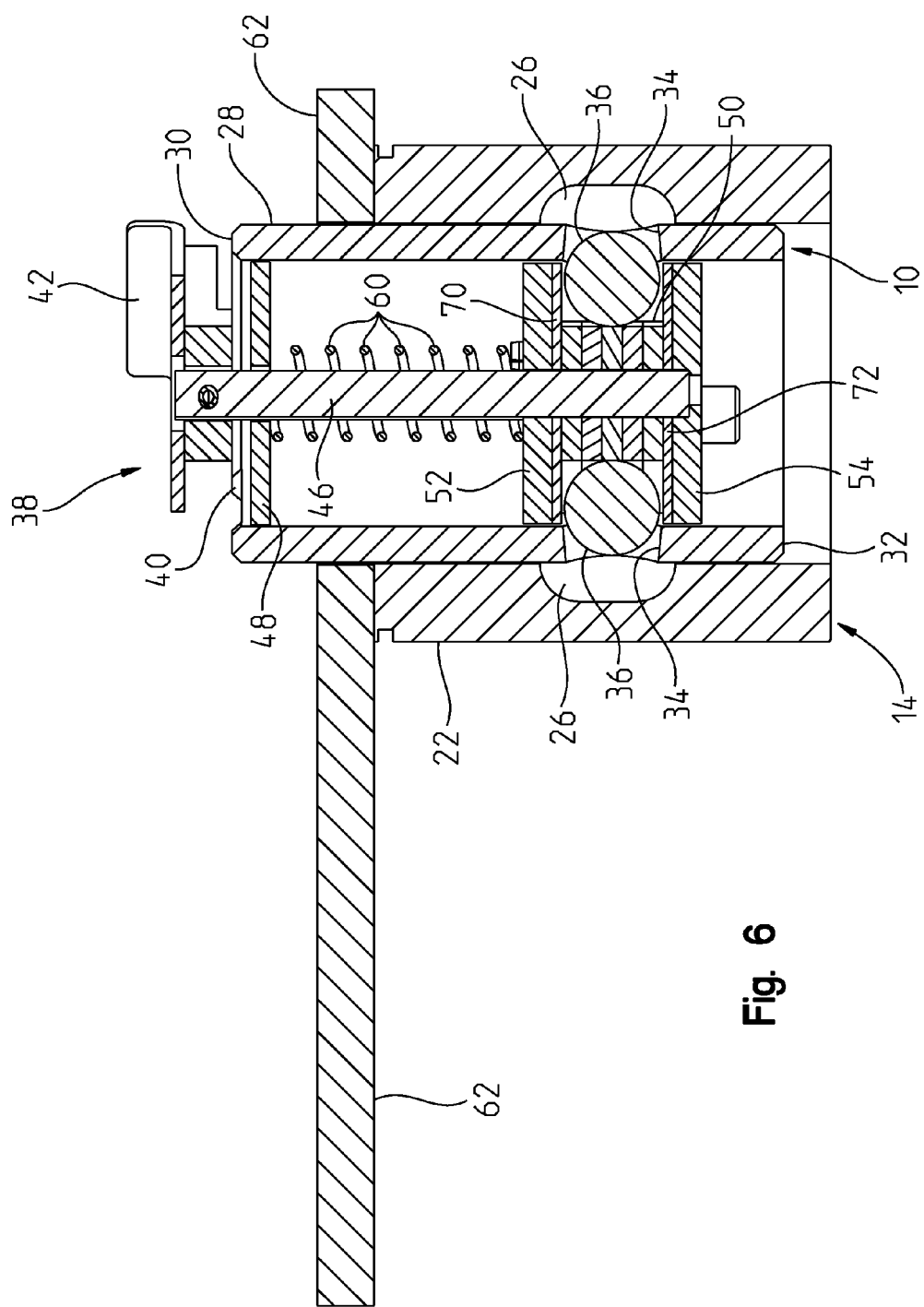
FIG. 6 is a cross-sectional side view of the adapter as seated in the socket with the locking mechanism in the unlocked position.
Figure 7:
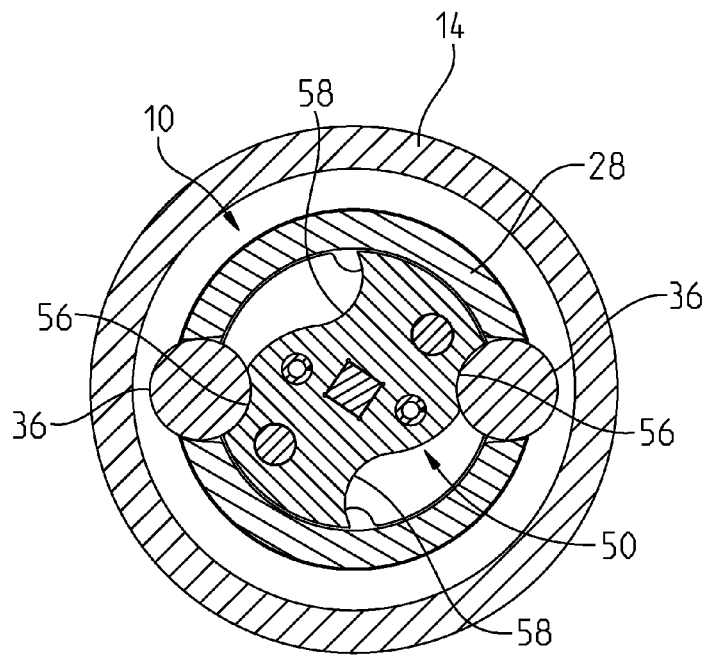
FIG. 7 is a cross-sectional top view of the adapter as seated in the socket with the locking mechanism in the locked position.
Figure 8:
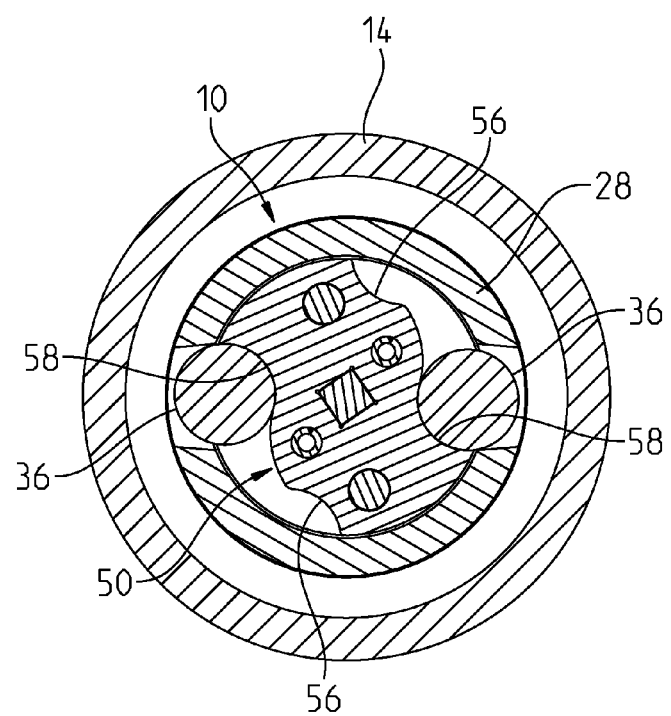
FIG. 8 is a cross-sectional top view of the adapter as seated in the socket with the locking mechanism in the unlocked position.

Adapter 10 is adapted for being locked within socket 14. Referring now to FIGS. 4 and 5, adapter 10 is formed having a cylindrically-shaped collar 28 defined by a wall 22 extending between an open upper end 30 and an open lower end 32. Collar 28 includes an aperture 34 formed through the wall 22 and spaced intermediately between the upper end 30 and the lower end 32. An inner chamber is defined by wall 22. Aperture 34 is shaped as a truncated cone, having a smaller diameter proximate the outer surface of collar 28 and a larger diameter proximate the inner surface of the collar, and having a uniform change in diameter from one surface to the other. A ball 36 is positioned within adapter 10 such that the ball is advanced into aperture 34 when the locking mechanism is moved to the locked position, such that a portion of the ball protrudes out of collar 28 and into cavity 26, thereby preventing adapter 10 from being removed from socket 14, as shown in FIG. 5. The shape of aperture 34 provides the benefit of smooth operation of adapter 10. Prior ball-and-aperture locking devices have heat-staked apertures, where the diameter of the aperture is uniform except for immediately proximate the outer wall, where there is a steeply ramped portion; as a result, these locking devices are characterized by halting or otherwise irregular movement when locking or unlocking the device. The present adapter 10 overcomes these failures by providing an aperture which is uniformly ramped such that ball 36 retreats from cavity 26 and rolls by gravity to the unlocked position, which provides a smooth motion when locking and unlocking adapter 10.

Figure 10:
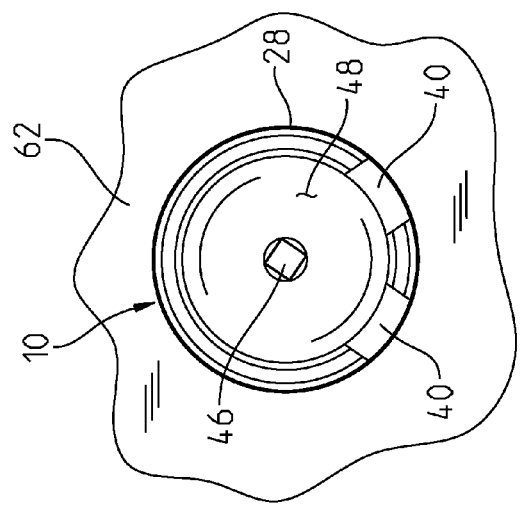
FIG. 10 is a top view of the adapter as seated in the socket with the arm removed to show the notches.
Figure 9:
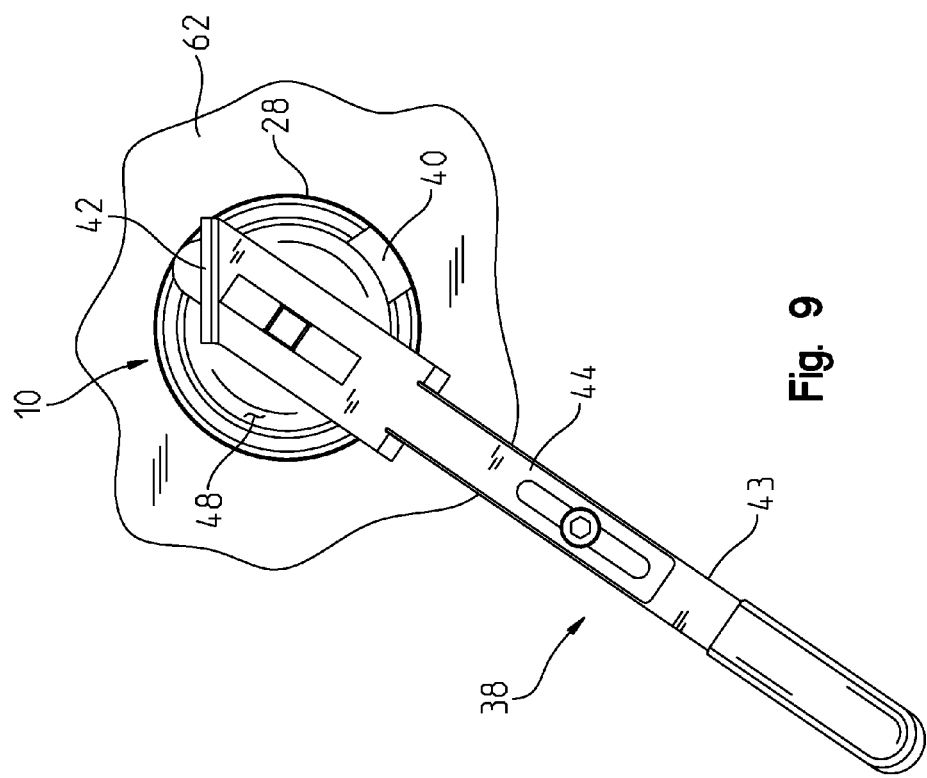
FIG. 9 is a top view of the adapter and socket.
Figure 11:
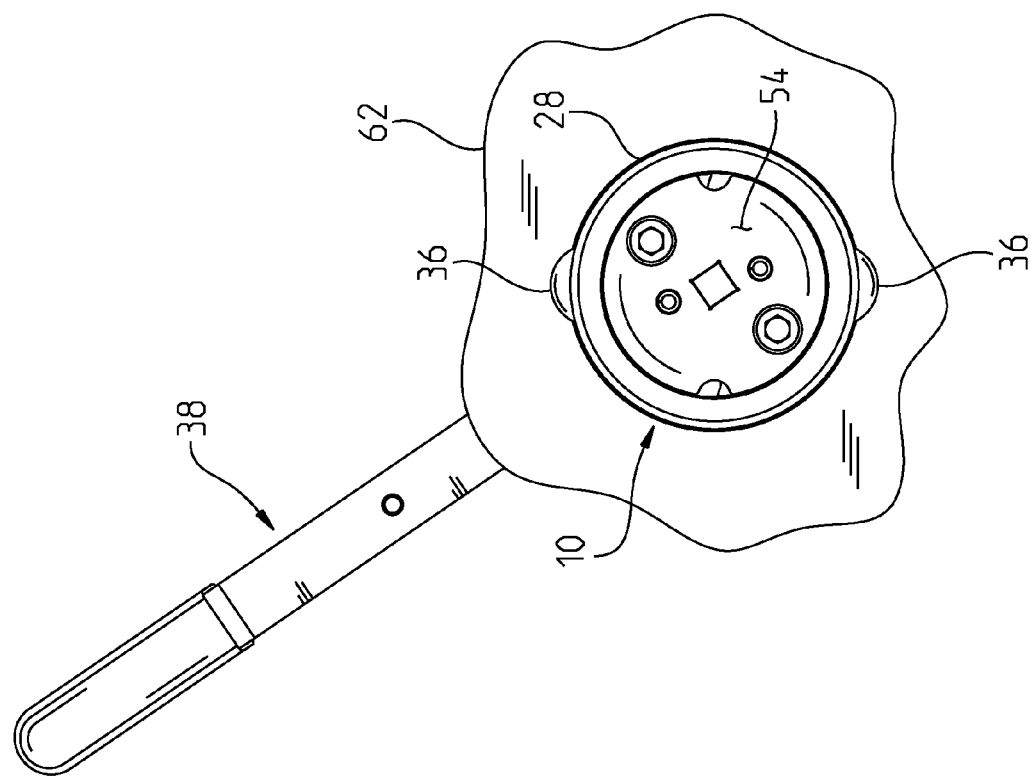
FIG. 11 is a bottom view of the adapter as seated in the socket with the vehicle cutaway to show the arm.
Figure 12:
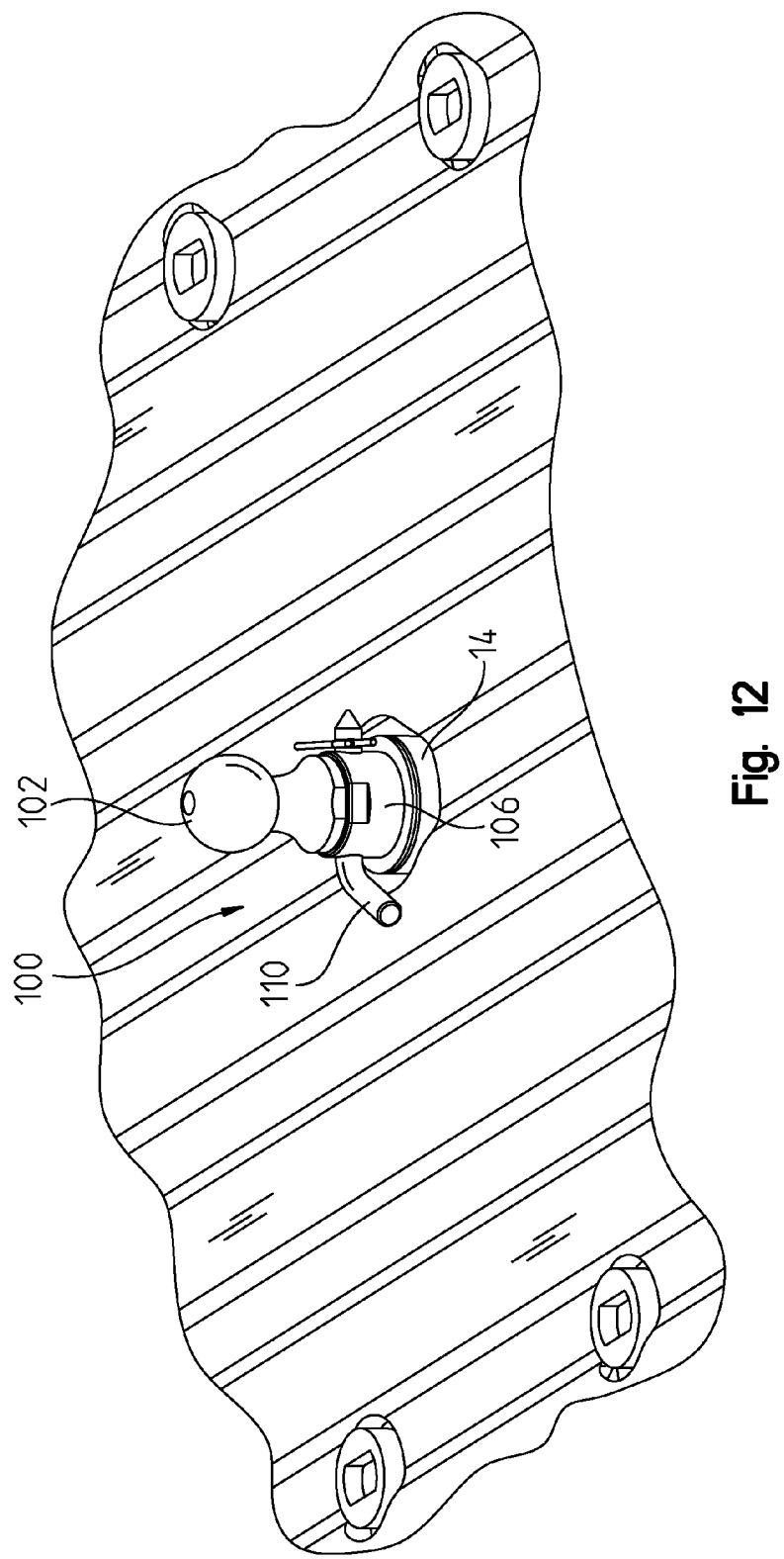
FIG. 12 is a perspective view of a ball-type adapter as seated in the socket.
Figure 13:
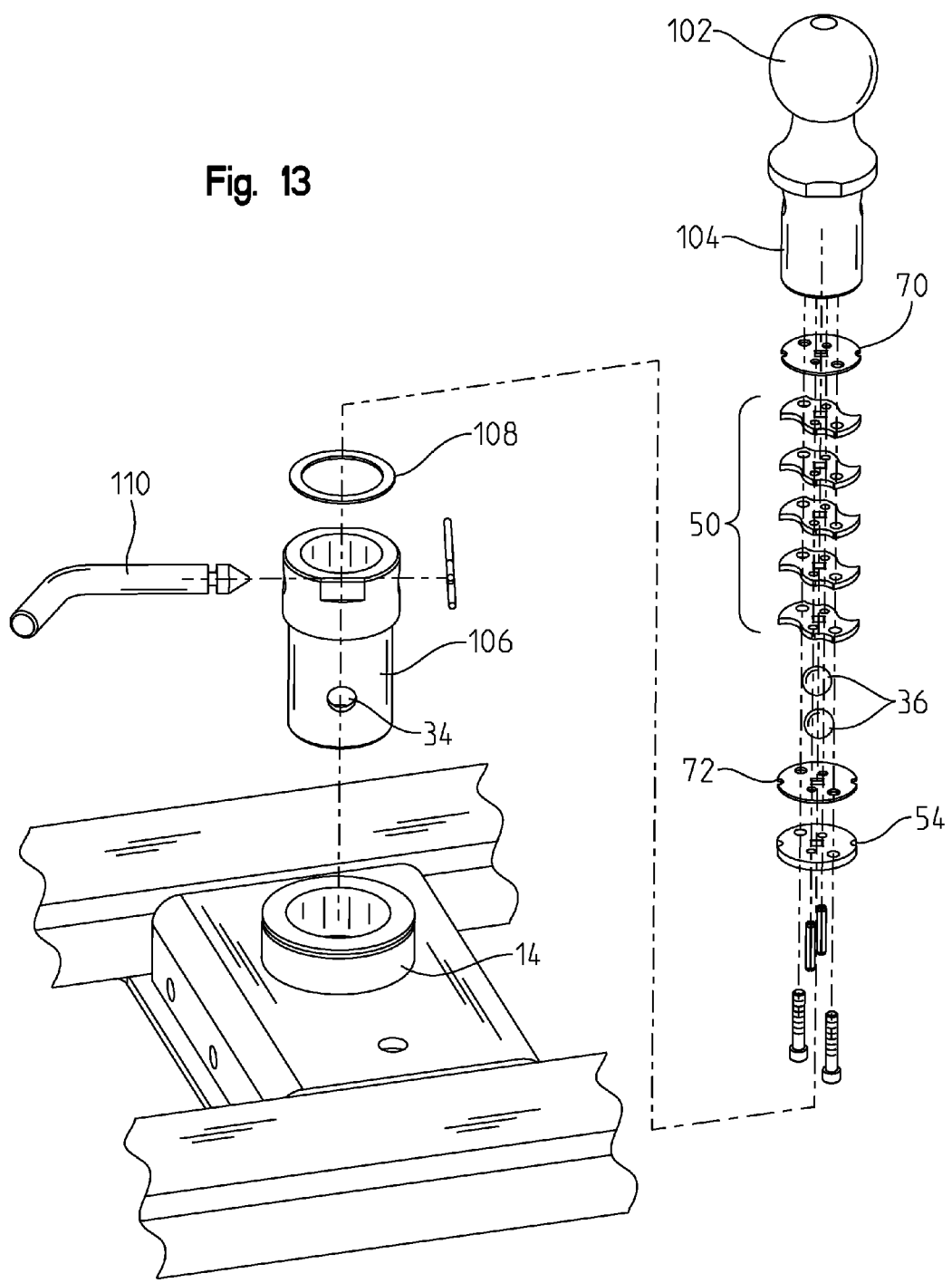
FIG. 13 is an exploded view of the adapter of FIG. 12.
Figure 14:
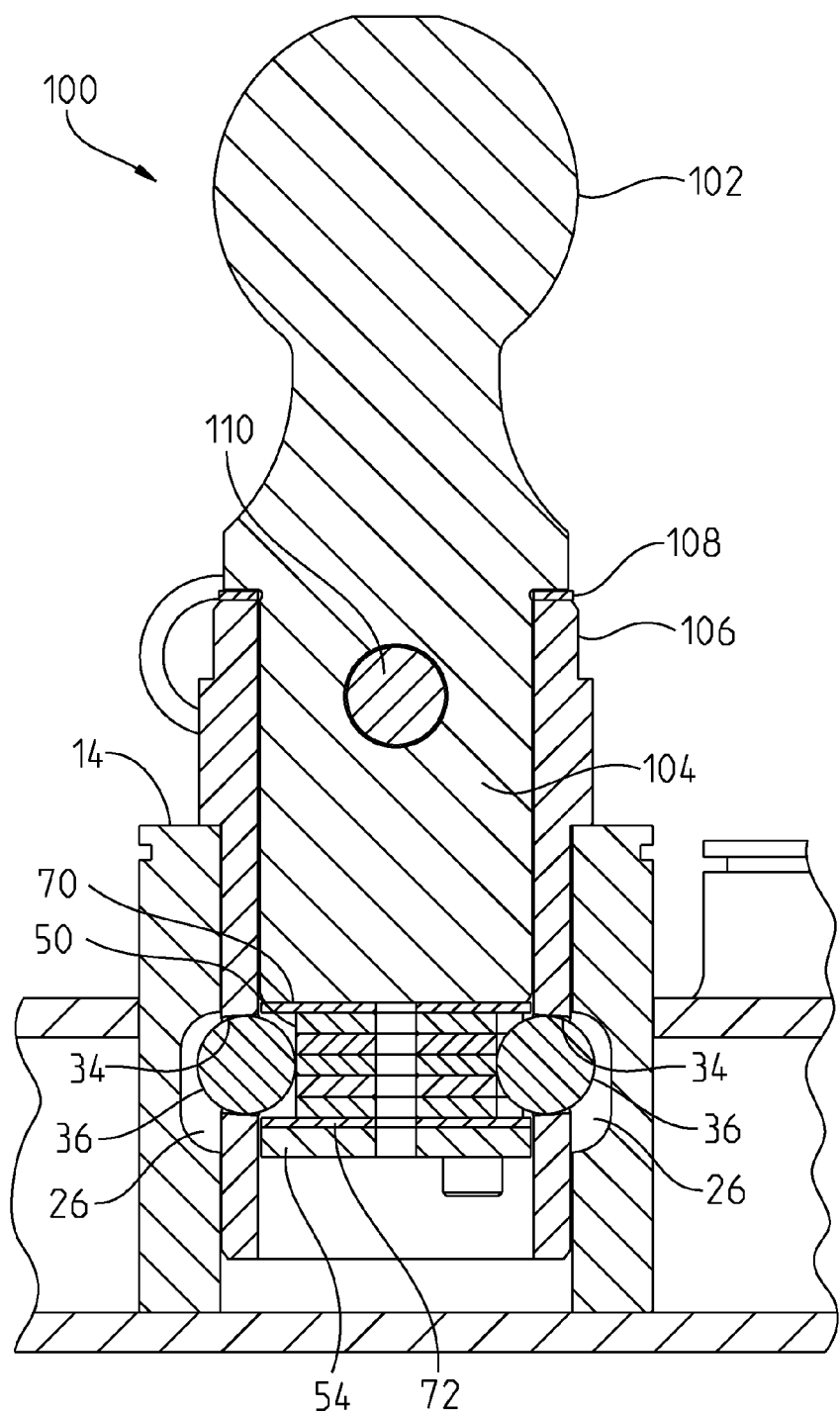
FIG. 14 is a cross-sectional side view of the adapter of FIG. 12 with the locking mechanism in the locked position.
Figure 15:
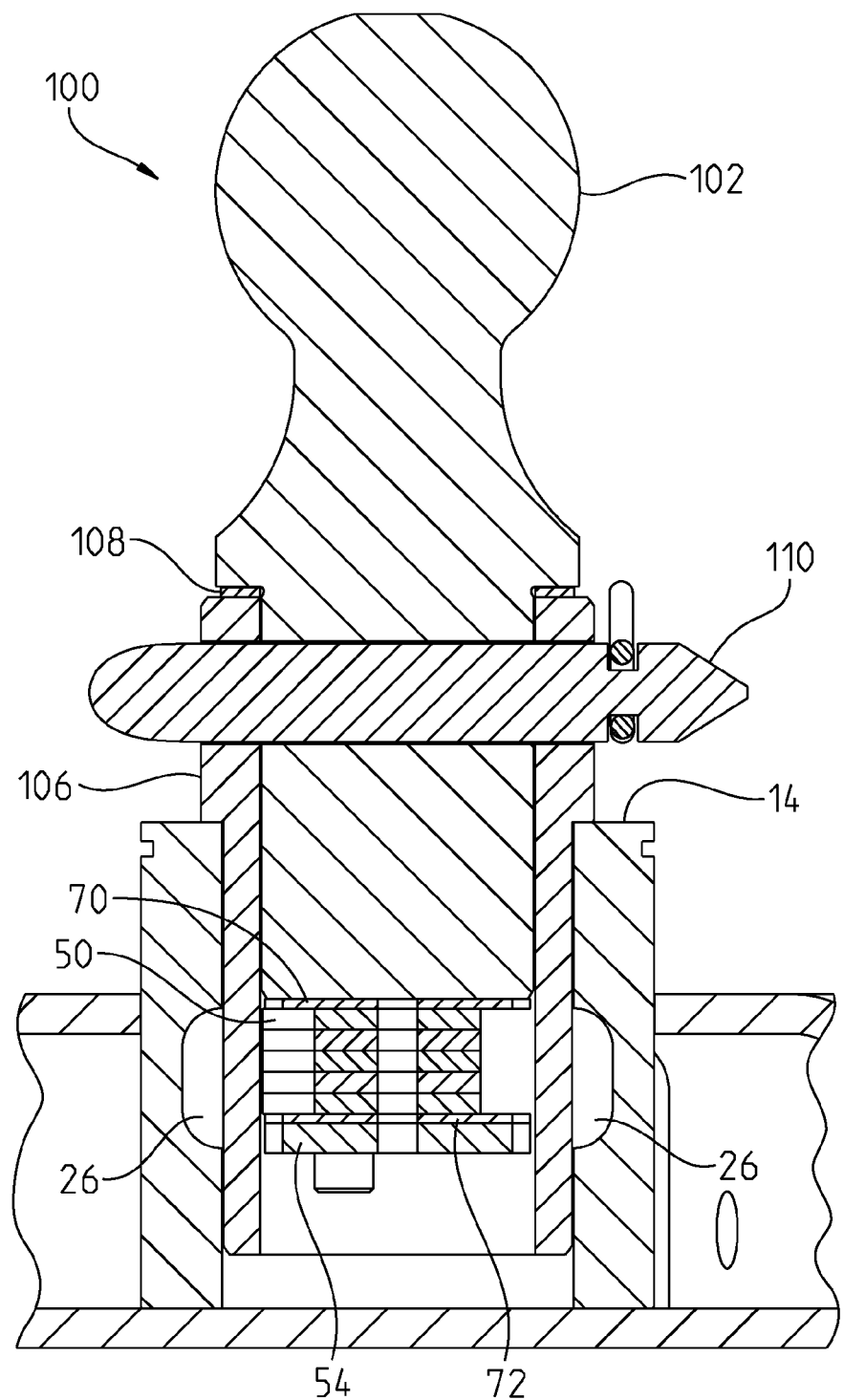
FIG. 15 is a cross-sectional end view of the adapter and socket of FIG. 14 and showing a cotter pin locking the hitch to the adapter.

Referring now to FIGS. 9 and 10, an arm 38 is adapted for actuating adapter 10 between the locked and the unlocked position. Arm 38 extends perpendicularly from opening 20. The rim of collar 28 is castellated, having notches 40 sized for accepting a portion of arm 38, such that a first notch holds arm 38 in the locked position and a second notch holds arm 38 in the unlocked position. Actuation between the locked and the unlocked position is achieved by pulling arm 38 axially away from collar 28 while rotating arm 38 radially to the desired position. Thereby, notches 40 function as safety devices to restrict arm 38 from moving between the unlocked and locked positions except when actuated by a user.

A locking mechanism, or tab 42, extends upwardly from arm 38. Tab 42 is adapted for engaging a portion of hitch assembly 12, such that when hitch assembly 12 is mounted in the vehicle, tab 42 prevents rotation of arm 38, see FIG. 2. In this way, tab 42 serves as a second safety device to restrict rotation of arm 38. With hitch assembly 12 properly installed, tab 42 holds arm 38 in the locked position, thereby when hitch assembly 12 is installed, adapter 10 is held in socket 14. Only by removing hitch assembly 12 can arm 38 be rotated to the unlocked position. In this way, a user is unable to install hitch assembly 12 to the vehicle unless arm 38 is in the locked position, thereby tab 42 removes the opportunity for user error in installing hitch assembly 12. When arm 38 is in any position other than the locked position, hitch assembly 12 will not seat properly in the vehicle, and a user will not be able to attach the hitch assembly to the vehicle, which will only be cured by moving arm 38 to the locked position. As such, to properly mount the hitch assembly 12 to the vehicle, the arm 38 must be seated in the notch 40 corresponding to the locking position, such that tab 42 is positioned to allow the hitch assembly to be installed.

Arm 38 is formed having a base arm 43 and a sliding arm 44. Tab 42 is carried on sliding arm 44. Sliding arm is slidingly mounted to base arm 43 such that sliding arm 44 is movable relative base arm 43, such that tab 42 is longitudinally positionable in a number of positions relative collar 28 to allow for tab 42 to be custom-positioned to fit with a given hitch assembly 12. In other words, tab 42 is movable by sliding arm 44 so that tab 42 can serve its locking function when used in combination with hitch assemblies of varying dimensions.

Referring to FIGS. 4 and 5, a shaft 46 extends from arm 38 into the inner chamber of collar 28. Shaft 46 serves as the axis about which arm 38 rotates. A head plate 48 includes an aperture through which shaft 46 passes, with head plate 48 offset from opening 20. Head plate 48 is welded to or otherwise anchored to collar 28. A cam, such as an S-cam 50, is carried on shaft 46 and is sandwiched between an upper plate 52 and a lower plate 54. Upper plate 52 is welded to or otherwise anchored to shaft 46. Ball 36 is carried between upper plate 52 and lower plate 54, such that plates 52, 54 serve as upper and lower boundaries for ball 36. S-cam 50 includes an "S" shaped cutout defined by a shallow recess 56 and a deep recess 58. The locked position is defined by ball 36 cradled adjacent shallow recess 56. The unlocked position is defined by ball 36 cradled adjacent deep recess 58. Rotation of arm 38 corresponds to a rotation of S-cam 50, which causes ball 36 to travel between shallow recess 56 and deep recess 58. It is contemplated that S-cam 50 is formed from a series of stacked plates, with upper plate 52, the plates forming S-cam 50 and lower plate 54 held in a stacked relationship by fasteners, such as a bolt. It is contemplated that upper plate 52 and lower plate 54 are formed from a low-friction material, such as plastic, to allow ball 36 to roll smoothly between the locked and the unlocked positions. In one embodiment, low friction plates 70, 72 contact ball 36, with one low friction plate 70 sandwiched between upper plate 52 and S-cam 50 and other low friction plate 72 sandwiched between lower plate 54 and S-cam 50. Each of head plate 48, upper plate 52, and low friction plates 70, 72 include an aperture passing through the respective center for accepting shaft 46. Lower plate 54 includes a stepped-aperture such that shaft 46 is seated on lower plate 54. The aperture through head plate 48 is such that shaft 46 is rotatable relative the head plate. The apertures through S-cam 50, low friction plates 70, 72, upper plate 52 and lower plate 54 are such that shaft 46 causes these plates to rotate.

A spring 60 is a coil spring which includes coils, with at least a portion of shaft 46 positioned radially inward of the coils. With head plate 48 attached to collar 28 and upper plate 52 attached to shaft 46, spring 60 braces against head plate 48 and urges upper plate 52 and shaft 46 down and away from head plate 48. Spring 60 urges arm 38 toward collar 28, thereby spring 60 holds arm 38 in notch 40. Pulling arm 38 up and away from collar 28 compresses spring 60 and allows arm 38 to clear notch 40 thereby freeing arm 38 to be rotated about shaft 46 to an other notch 40, thereby moving the locking mechanism between the locked and the unlocked position. Spring 60 is sandwiched between head plate 48 and upper plate 52.

Adapter 10 is used in combination with a hitch assembly 12. In one embodiment, hitch assembly 12 includes a mounting plate 62 which is formed integrally around adapter 10 and serves as a base on to which a fifth-wheel can be mounted.

Referring now to FIGS. 12-15, in another embodiment, an adapter 100 includes a ball 102 for making mating contact with the tongue of a trailer (not shown). In this embodiment, numbers are reused from the embodiment shown in FIGS. 1-11 where the structure of the given part is substantially the same between the two embodiments. Adapter 100 includes an extension member 104 extending below the ball and which is sheathed within a collar 106. S-cam 50 is positioned below extension member 104, and optionally includes a low friction plate 70 spaced between the extension member 104 and the S-cam 50. The collar 106 includes one or more apertures 34 which facilitate balls 36 locking collar 106 in socket 14. Ball 102 is rotatable relative collar 106 to move adapter 10 between the locked and the unlocked position, wherein rotation of the ball 102 causes S-cam 50 to rotate moving balls 36 in and out of apertures 34. When in the locked position, a cotter pin 110 is slidable through apertures in both collar 106 and extension member 104, thereby holding adapter 100 in the locked position. S-cam 50 is fastened to extension member 104 by one or more fasteners, thereby S-cam 50 is held in fixed rotational contact with extension member 104. A low friction plate is optionally spaced below S-cam 50. A lower plate 54 is positioned below the S-cam 50, with the S-cam sandwiched between lower plate 54 and extension member 104. A washer 108 is spaced between collar 106 and ball 102, wherein the washer serves as a bearing to allow ball 102 and extension member 104 to rotate relative collar 106. In this embodiment, with the cotter pin 110 in place, the user will know the adapter 100 is in the locked position since the apertures on the collar 106 and extension member 104 will only align when in the locked position, thereby preventing improper installation.

What is claimed is:

1. An adapter serving as an anchor point for securing a trailer or other object to a vehicle having a socket with a first inside diameter, said socket including a cavity with a second inside diameter, said second inside diameter larger than said first inside diameter, said adapter comprising:
   a collar formed having a wall including an inner surface and an outer surface, said inner surface defining an inner chamber, said outer surface adapted to be received by said socket within said first inner diameter;
   an aperture formed in said wall of said collar extending through said wall from said inner surface of said wall to said outer surface of said wall, said aperture shaped as a truncated cone, having a larger diameter at said inner surface of said wall and a smaller diameter at said outer surface of said wall;
   an S-cam carried within said inner chamber of said collar, said S-cam being rotatable about a central axis with respect to said inner chamber and including a deep recess and a shallow recess within an outer surface of said S-cam; and a ball retained in said aperture and moveable between an retracted position and an extended position wherein said ball protrudes beyond said outer surface of said wall, said ball movable along said outer surface of said S-cam between an unlocked position corresponding to said ball being located in said deep recess and a locked position corresponding to said ball being in said shallow recess, whereby said ball protrudes into said cavity when said ball is in said shallow recess and said collar is in said socket.

2. The adapter of claim 1, a shaft fixed from rotation with respect to said S-cam, said shaft rotatable between said locked position and said unlocked position, said locked position being where said ball is located in said extended position, said unlocked position being where said ball is in said refracted position.

3. The adapter of claim 2, and a locking member adapted to selectively fix said S-cam from rotation with respect to said collar.

4. The adapter of claim 3, said collar having castellations, said locking member being an arm that is fixed to said shaft and rotatable therewith, said arm engaging with said castellation when said S-cam is in said locked position.

5. The adapter of claim 3, and a second aperture formed in said wall of said collar, said locking member adapted to extend through said second aperture and engage said shaft to selectively fix said shaft from rotation when said shaft is in its locked position.

6. The adapter of claim 2, wherein said S-cam is formed from a series of stacked plates.

7. The adapter of claim 6, said S-cam having and a low friction surface, said surface limiting the vertical movement of said ball.

8. The adapter of claim 7, wherein said S-cam is formed from a series of stacked plates.

9. An adapter for selectively fixing to a socket, said socket having a first inside surface, and a second inside surface defining a cavity, said second inside surface extending outwardly of than said first inside surface, said adapter comprising:
   a collar having a wall including an inner surface and an outer surface, said inner surface defining an inner chamber said outer surface smaller than first inside surface;
   a cam movable with respect to said collar between a locked and an unlocked position, said cam having a shallow recess and a deep recess on an outer surface of said cam, said cam carried within said inner chamber;
   a shaft extending from said cam and movable therewith;
   an aperture formed in said wall of said collar extending through said wall from said inner surface to said outer surface, said aperture having a smaller diameter near said outer surface and a larger diameter near said inner surface;
   a ball retained inside said aperture and having a diameter, said diameter of said ball being smaller than said larger diameter of said aperture and larger than said smaller diameter, said ball movable along said cam between said shallow recess and said deep recess, said locked position defined by said ball adjacent to said shallow recess and extending into said cavity, and said cam, said, said unlocked position defined by said ball adjacent to said deep recess.

10. The adapter of claim 9, and a locking member adapted to restrict movement of said cam when said cam is in said locked position.

11. The adapter of claim 10, said collar having a castellation, said locking member engaging with said castellation when said cam is in said locked position.

12. The adapter of claim 11, wherein said cam is formed from a series of stacked plates.

13. The adapter of claim 10, and a second aperture formed in said wall of said collar, said locking member adapted to extend through said second aperture and engage said shaft when said cam is in said locked position.

14. The adapter of claim 9, said cam having a low friction surface.

15. The adapter of claim 9, wherein said locking member cam is formed from a series of stacked plates.

16. An adapter serving as an anchor point for securing a trailer or other object to a vehicle, said adapter comprising:

a socket affixed to said vehicle and having an inside surface, said inside surface having a depression to define a cavity;

a collar having an exterior surface and an interior surface, said interior surface defining an inner chamber, a portion of said exterior surface adapted to be received by said socket;

an aperture in said surface of said collar, said aperture shaped as a truncated cone, said cone having a smaller diameter intersecting said exterior surface and a larger diameter intersecting said interior surface;

a locking member carried within said inner chamber and movable between a locked and an unlocked position, said locking member having a recess; and a ball disposed between said recess and said exterior surface when said locking member is in said unlocked position, said locking member rotatable to said locked position in which said locking member moves said ball outwardly of said exterior surface so that said ball may be received in said cavity for locking engagement with socket.

17. The adapter of claim 16, said locked position defined by said ball extending into said depression when said locking member is in said locked position.

18. The adapter of claim 16, said locking member capable of being fixed with respect to said collar when said locking member is in said locked position.

19. The adapter of claim 16, and an extension member carried within said collar, said extension member joined to said locking member, a pin is optionally insertable through said collar and said extension member, whereby said pin prevents movement of said locking member between said locked position and said unlocked position.

* * * * *